May 6, 1924.

L. A. YOUNG ET AL 1,493,179

COMPOUND SPRING CONNECTION

Filed Sept. 20, 1921    2 Sheets-Sheet 1

INVENTORS:
LEONARD A. YOUNG
&
HUBERT V. BACKUS.

Clement R. Stickney
ATTORNEY.

May 6, 1924.

L. A. YOUNG ET AL 1,493,179

COMPOUND SPRING CONNECTION

Filed Sept. 20, 1921 2 Sheets-Sheet 2

INVENTORS:
LEONARD A. YOUNG
&
HUBERT V. BACKUS.

Clement R. Stickney
ATTORNEY.

Patented May 6, 1924.

1,493,179

UNITED STATES PATENT OFFICE.

LEONARD A. YOUNG AND HUBERT V. BACKUS, OF DETROIT, MICHIGAN; SAID BACKUS ASSIGNOR TO SAID YOUNG.

COMPOUND-SPRING CONNECTION.

Application filed September 20, 1921. Serial No. 501,959.

*To all whom it may concern:*

Be it known that we, LEONARD A. YOUNG and HUBERT V. BACKUS, citizens of the United States, residing at Detroit, in the county of Wayne and State of Michigan, have invented certain new and useful Improvements in Compound-Spring Connections, of which the following is a specification.

This invention relates to spring seat constructions and more particularly to compound springs for such structures wherein the base springs of a certain number of turns and gauge each support an upper section of different gauge and possibly of different pitch, the object being to provide for a seat with soft and pliant upper portion and a lower portion of greater capability of resistance to severe shock.

The invention consists in the matters hereinafter set forth and more particularly pointed out in the appended claim.

In the drawings, Fig. 1 is a plan view, partially broken away, of a spring seat construction embodying features of the invention;

Figure 1:
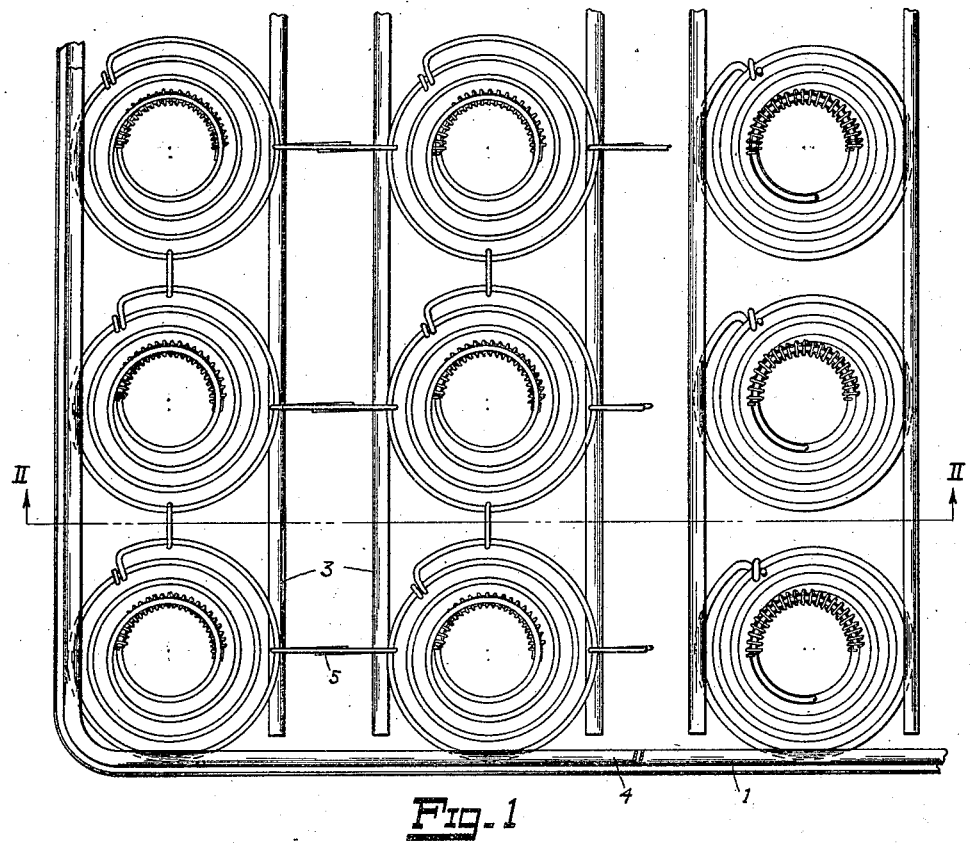

Referring to the drawings, a base is formed of a rim frame 1 and the lower sections 2 of upright body springs which are crimped in one of the grooves of the rim and in turn are connected by and act as supports for transverse strips 3, into the grooves of which the end turns of the spring are entered and clinched in place. An upper frame 4 of U-section and wire clips 5 form the upper part of this structure. Any other desired or preferred form of base, rim frame and stays or clips may be used.

Figure 4:
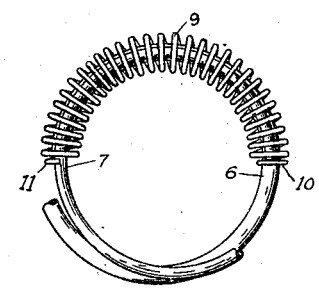
Fig. 4 is a view in detail and in section taken on or about line IV—IV of Fig. 3.
Figure 6:
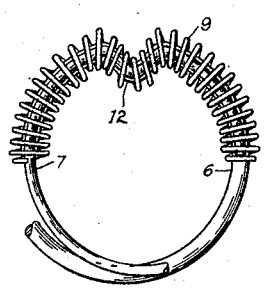
Fig. 6 is a view in detail showing one means of anchoring the connecting member and body springs together.

The base section 2 of each body spring has the upper coil 6 thereof secured to the mating lower turn 7 of an upper section 8 by a connector 9 in the form of a spiral of spring wire or the like, proportioned to closely encircle the superposed turns and provided at the ends with eyelets 10 and 11, each of which closely grips one of the spring turns and abuts the other adjacent spring turn. When under pressure the turns 6 and 7 tend to screw together and also to flatten and expand and these movements are resisted by the end turns 10 and 11. Retrograde movement of the springs is prevented in several ways. Thus, as shown in Fig. 4, the connector spiral grips the coils closely enough to prevent this, while in Fig. 6 the main spring sections are given an offset as indicated at 12.

Figure 8:
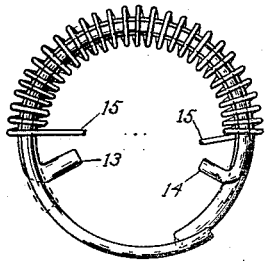
Figs. 8 and 9 are views in detail showing an easy way of assembling the parts as depicted in Fig. 7.
Figure 9:
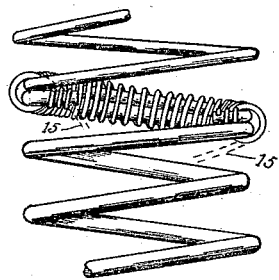
Figure 7:
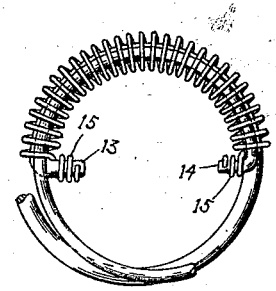
Fig. 7 is a view in detail of another way of securing the connector and the body springs.
Figure 2:
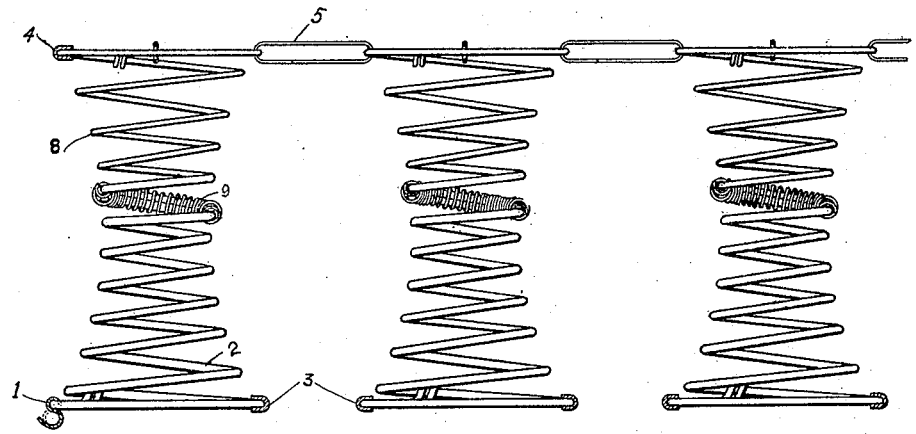
Fig. 2 is a view in section taken on or about line II—II of Fig. 1.
Figure 3:
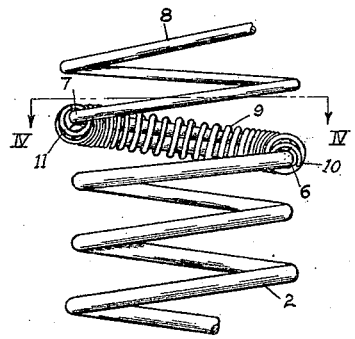
Fig. 3 is a view in detail, enlarged, of one form of compound body springs.

In Fig. 7 the end portions 13 and 14 of the spring sections are inturned and the end portions 15 of the spirals which as indicated in Figs. 8 and 9, are left straight for this purpose, are twisted around these offset ends.

Figure 5:
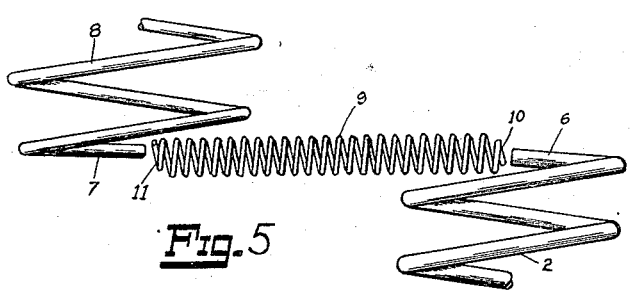
Fig. 5 is a view in detail showing the method of assembling springs.

In assembling, the parts are readily threaded together as indicated in Fig. 5, by merely inserting the end turns into the straight spiral and threading them through, each end coil entering one of the eyelets 10 or 11 of the spiral, and the connector being so disposed when the parts are fully seated on each other that these eyelets 10 and 11 are in offset relation and form good abutments to prevent the springs working through.

As a result of this method of construction, body springs are obtained having base sections of one pitch and gauge and an upper section of different pitch or gauge, which are firmly united by the connectors in such manner that they do not tend to work apart and are noiseless in action. The connectors grip the superposed turns very firmly because of the flexion of the connectors from their normal straight position when they are threaded on to the spiral turns.

Obviously changes in the detail of construction may be made without departing from the spirit of the invention and we do not care to limit ourselves to any particular form or arrangement of parts.

We claim as our invention:

The combination of coiled spring members having superposed end coils, and a connector therefor comprising a coiled spring to which the end coils are introduced with the ends of the spring members projecting from opposite ends of the connector and turned laterally, the ends of the connector spring being coiled about such laterally turned ends.

In testimony whereof we affix our signatures.

LEONARD A. YOUNG.
HUBERT V. BACKUS.